United States Patent
McLaughlin et al.

(10) Patent No.: US 6,421,570 B1
(45) Date of Patent: Jul. 16, 2002

(54) SYSTEMS AND METHODS FOR ACCESSING DATA USING A CYCLIC PUBLISH/SUBSCRIBE SCHEME WITH REPORT BY EXCEPTION

(75) Inventors: Paul F. McLaughlin, Hatfield; Jethro F. Steinman, Haverton; Ken Gorman, Warminster; Muslim G. Kanji, Allentown; Joseph P. Felix, Glenside, all of PA (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 08/920,265

(22) Filed: Aug. 22, 1997

(51) Int. Cl.$^7$ .............................................. G05B 15/00
(52) U.S. Cl. .......................................... 700/2; 709/201
(58) Field of Search ................................ 700/2, 3, 4, 5; 709/201, 206, 207, 224; 340/825.54, 825.44, 825.26, 825.27, 825.06

(56) References Cited

U.S. PATENT DOCUMENTS

| | | | |
|---|---|---|---|
| 4,680,753 A | * 7/1987 | Fulton et al. .................. 370/85 |
| 4,698,766 A | 10/1987 | Entwistle et al. ...... 364/468.02 |
| 4,745,559 A | 5/1988 | Willis et al. .................. 705/37 |
| 4,815,030 A | 3/1989 | Cross et al. .................. 707/10 |
| 5,428,606 A | 6/1995 | Moskowitz ................. 370/400 |
| 5,452,201 A | * 9/1995 | Pieronek et al. ............ 364/188 |
| 5,463,735 A | 10/1995 | Pascucci et al. ......... 395/200.1 |
| 5,734,830 A | * 3/1998 | Balogh et al. .............. 709/208 |
| 5,978,753 A | * 11/1999 | Eidson ....................... 702/188 |

FOREIGN PATENT DOCUMENTS

DE  195 15 208  10/1996

OTHER PUBLICATIONS (Cavalieri et al., Impact of fieldbus on communication in robotic systems, Feb. 1997, Robotics and Automation, IEEE Transactions, vol. 13 issue1, pp. 30–48).*

* cited by examiner

Primary Examiner—William Grant
Assistant Examiner—Chad Rapp
(74) Attorney, Agent, or Firm—William A. Munck (57) ABSTRACT

The present invention provides systems and methods for controlling associated processes in a process facility and, in particular, for distributing data among nodes of a real time process control system that controls the process facility. An exemplary real time process control system includes a plurality of sensors, controllable devices, and communication paths, as well as a computer system. The sensors and controllable devices are associated with various ones of the processes of the process facility, and the communication paths associate the sensors and controllable devices with the computer system. The computer system operates on data relating to the process facility, and distributes the data among the nodes thereof. The nodes are associated with one another by ones of the communication paths also. The computer system includes subscriber nodes that desire data associated with certain of the processes and a publisher node. The publisher node monitors subscription lists associated with the subscriber nodes and, in response thereto, selectively communicates instances of the data to the subscriber nodes using ones of the communication paths. The communication paths have data traffic capacities and the computer system controls data distribution using the publisher node to efficiently utilize such data traffic capacities.

24 Claims, 4 Drawing Sheets

SYSTEMS AND METHODS FOR ACCESSING DATA USING A CYCLIC PUBLISH/ SUBSCRIBE SCHEME WITH REPORT BY EXCEPTION

CROSS-REFERENCE TO RELATED APPLICATIONS

The present invention is related to that disclosed in (1) U.S. patent application Ser. No. 08/916,870, entitled "Systems and Methods for Implementing a Dynamic Cache in a Supervisory Control System," and (2) U.S. patent application Ser. No. 08/916,871, entitled "Systems and Methods for Generating and Distributing Alarm And Event Notifications," which applications are commonly assigned to the Assignee of the present invention and filed concurrently herewith. The disclosures of these related patent applications are incorporated herein by reference for all purposes as if fully set forth herein.

TECHNICAL FIELD OF THE INVENTION

The present invention is directed, in general, to process control systems and, more specifically, to process control systems and methods of operating the same that use a publish/subscribe data distribution scheme.

BACKGROUND OF THE INVENTION

A present day process facility (e.g., a manufacturing plant, a mineral or crude oil refinery, etc.) is typically managed using a distributed control system. A contemporary control system includes numerous modules that are tailored to monitor and/or control various processes of the facility. Conventional means link these modules together to produce the distributed nature of the control system. This affords increased performance and a capability to expand or reduce (scale) the control system to satisfy changing facility needs.

Process facility management providers, such as HONEYWELL, INC., develop process control systems that can be tailored to satisfy wide ranges of process requirements (e.g., global, local or otherwise) and facility types (e.g., manufacturing, refining, etc.). Such providers have two principle objectives. The first objective is to centralize control of as many processes as possible to improve an overall efficiency of the facility. The second objective is to support a common interface that communicates data among various modules controlling or monitoring the processes, and also with any such centralized controller or operator center.

Each process, or group of associated processes, has one or more input characteristics (e.g., flow, feed, power, etc.) and one or more output characteristics (e.g., temperature, pressure, etc.) associated with it. Model predictive control ("MPC") techniques have been used to optimize certain processes as a function of such characteristics. One MPC technique uses algorithmic representations of certain processes to estimate characteristic values (represented as parameters, variables, etc.) associated with them that can be used to better control such processes. In recent years, physical, economic and other factors have been incorporated into control systems for these associated processes.

Examples of such techniques are described in U.S. Pat. No. 5,351,184 entitled "Method of Multivariable Predictive Control Utilizing Range Control;" U.S. Pat. No. 5,561,599 entitled "Method of Incorporating Independent Feedforward Control in a Multivariable Predictive Controller;" U.S. Pat. No. 5,572,420 entitled "Method of Optimal Controller Design of Multivariable Predictive Control Utilizing Range Control;" and U.S. Pat. No. 5,574,638 entitled "Method of Optimal Scaling of Variables in a Multivariable Predictive Controller Utilizing Range Control," all of which are commonly owned along by the assignee of the present invention and incorporated herein by reference for all purposes (the foregoing issued patents and U.S. patent application Ser. No. 08/490,499, previously incorporated herein by reference, are collectively referred to hereafter as the "Honeywell Patents and Application").

The distributed process control systems used to monitor and control a process are frequently linked by common communication pathways, such as by a LAN architecture or by a WAN architecture. When a requesting node needs a datum from a responding node, it issues a request for the datum across the network and the responding node then returns the datum back across the network. This request/respond cycle is repeated as frequently as the requesting node needs the current value of the datum. Inevitably, this leads to data distribution problems on the network as data traffic on the network nears the maximum bandwidth of the network and bottlenecks are created at heavily requested nodes. There is a need in the art for improved control systems capable of distributing large amounts of data between nodes of a network without exceeding the bandwidth of the network and without forming bottlenecks at heavily requested nodes. In particular, there is a need in the art for improved control systems capable of supplying the latest values of needed data to a large number of nodes with the minimum amount of bus traffic.

SUMMARY OF THE INVENTION

To address the above-discussed deficiencies of the prior art, it is a primary object of the present invention to provide a data distribution, or delivery, scheme that efficiently utilizes network bandwidth and limits bottleneck formation; such a scheme, by definition, is robust, reliable, deterministic and flexible. As introduced hereinabove, a typical process facility includes many associated processes, various ones of which are associated with different stages of some overall process (e.g., natural resource refining, filtration, gas/oil separation, fabrication or other like process). The present invention introduces systems and methods that optimize distribution of information and improve a cooperation between various facility process controls, whether peer-to-peer, client and server, or otherwise.

In the attainment of this primary object, the present invention provides systems and methods for controlling associated processes within process facilities and, in particular, for distributing data among nodes of a real time process control system that controls the same. An exemplary real time process control system includes a plurality of sensors, controllable devices, and communication paths, as well as a computer system. The sensors and controllable devices are associated with various ones of the processes of the process facility, and the communication paths associate the sensors and controllable devices with the computer system. The computer system operates on data relating to the process facility, and distributes the data among the nodes thereof. The nodes are associated with one another by ones of the communication paths also.

An exemplary computer system includes subscriber nodes that desire data associated with certain of the processes and a publisher node. The publisher node monitors subscription lists associated with the subscriber nodes and, in response thereto, selectively communicates instances of the data to the subscriber nodes using ones of the communication paths. The communication paths have data traffic capacities and the computer system controls data distribution using the publisher node to efficiently utilize such data traffic capacities.

In an advantageous embodiment, the foregoing system uses a report by exception scheme, that is described in detail hereinbelow, within the above-described subscribe/publish methodology to further reduce the amount of data traffic on the communications paths to increase the quantity of data that can be subscribed for a given bandwidth. Subscription allows subscriber nodes to request multiple items via a subscription list associated with the publisher nodes, rather than constantly forming or issuing its requests, and without any knowledge of the distribution of the items among other nodes. The report by exception scheme further reduces bandwidth by communicating data from the publisher node to the subscriber nodes when data has changed.

In a preferred embodiment, the subscription lists are modifiable, enabling the publisher nodes, and the system overall, to adjust dynamically to the needs of the subscriber nodes. This is an important aspect of this embodiment because it does not rely upon or expect long term, statistically configured static publication models. Further, this embodiment supports subscription lists that include "situational," implementation-based, application-dependent or other like non-datum-by-datum (non-FIP, Fieldbus Foundation, etc.) information.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein lithe numbers designate like objects, and in which.

DETAILED DESCRIPTION

FIGS. 1 through 4, discussed below, and the various embodiments used to describe the principles of the present invention in this patent document are by way of illustration only and should not be construed in a manner that limits the scope of the present invention in its broadest form. Those skilled in the art will understand that the principles of the present invention may be implemented in any suitably arranged process facility, and that the various schemes disclosed herein may be implemented in any suitably arranged hardware-, firmware-, or software-based system, or combination thereof. The term "or," as it is used herein, is inclusive, meaning and/or.

Figure 1:
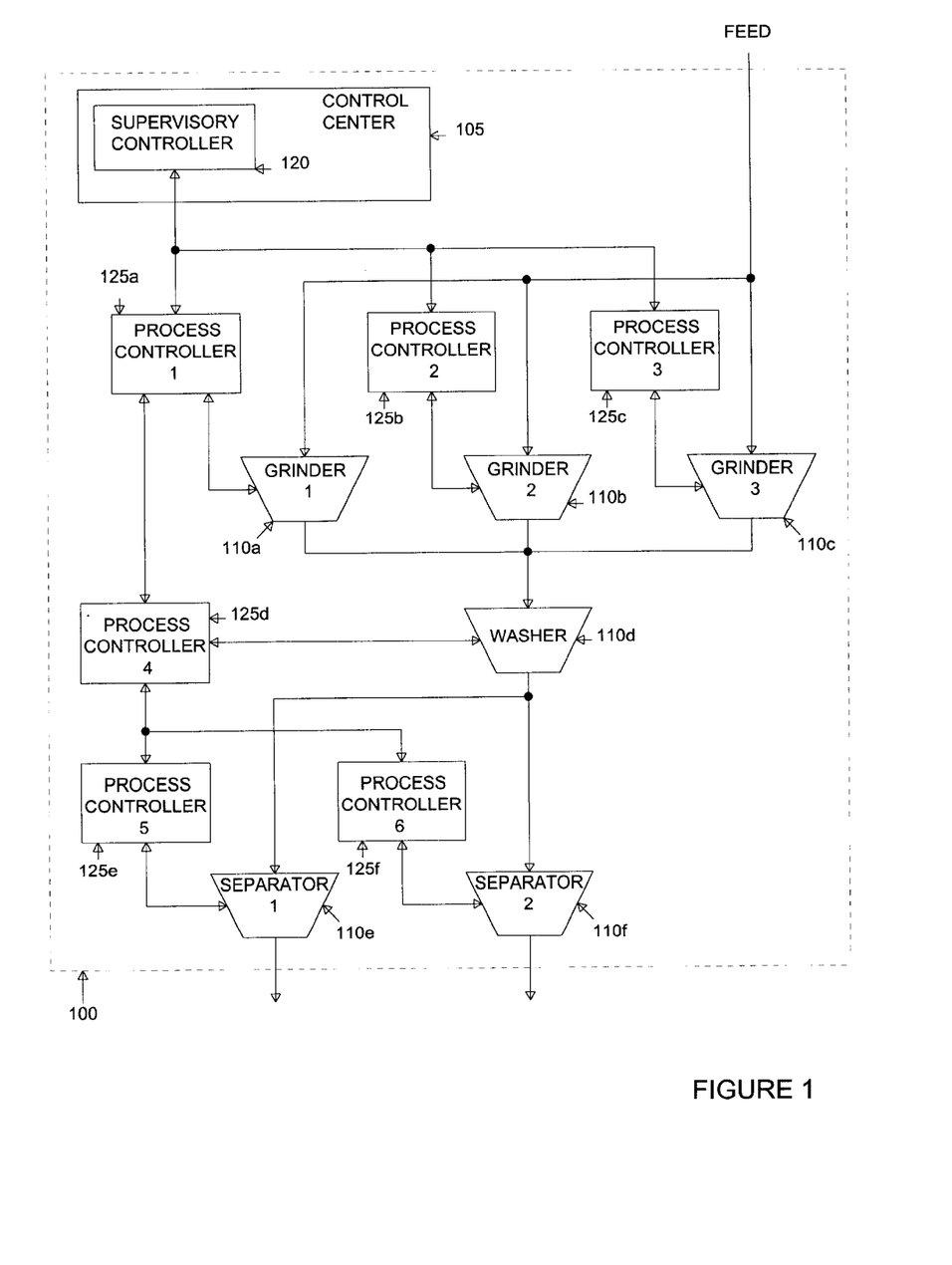
FIG. 1 illustrates a simple block diagram of an exemplary process facility with which a control system according to the principles of the present invention may be used.

Turning initially to FIG. 1, illustrated is a simple block diagram of an exemplary process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110c that receive a "feed" of raw material and grind the same, such as by using a pulverizer or a grinding wheel, into smaller particles of raw material. The second process stage includes a washer 110d that receives the ground raw materials and cleans the same to remove residue from the first stage. The third process stage includes a pair of separators 110e and 110f that receive the ground, washed raw materials and separate the same into desired minerals and any remaining raw materials. Since this process facility is provided for purposes of illustration only and the principles of such a facility are well known, further discussion of the same is beyond the scope of this patent document and unnecessary.

The exemplary control system includes a supervisory node, or supervisory controller 120, and six process nodes, or process controllers 125a–125f, each of which is implemented in software and executable by a suitable conventional computing system (standalone or network), such as any of HONEYWELL, INC.'s AM K2LCN, AM K4LCN, AM HMPU, AxM or like systems. Those skilled in the art will understand that the terms "nodes" and "controllers" are used somewhat interchangeably, in point of fact, however, a node includes one or more controllers, which may suitably be implemented in hardware, software, or firmware, or some suitable combination of the same. For instance, a computer system may be exemplary of a node and software executing in conjunction with the hardware thereof may be exemplary of a controller. In general, the use of nodes/controllers, particularly computers or computing systems, in control systems for process facilities is well known.

Supervisory controller 120 is associated with each of process controllers 125, directly or indirectly, to allow the exchange of information (broadly, "data"). Depending upon its context, the phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like. Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility, and through conventional and suitably arranged sensors and controllable devices that are associated therewith.

Supervisory controller 120 generates, in response thereto, control data that is communicated via process controllers 125 to associated processes 110 to optimize process facility 100. The phrase "control data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the control data is dynamically generated and is based at least upon a given facility's efficiency, production or economic cost, and most preferably all three.

Process controllers 125 monitor associated processes 110 and operate to varying degrees in accordance with the control data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the control data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

Additionally, data may be transferred directly between process controllers 125a–f in a peer-to-peer relationship, as in a LAN network. For example, process controller 4 (node 125d), which controls the washer (item 110d), may request data from process controllers 1–3 (nodes 125a to 125c), which control grinders 1–3 (processes 110a to 100c), in order to determine the rate at which ground raw material is being output therefrom. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

As stated above, the amount of data being transferred between the process nodes 125 and between the supervisory node 120 and the process nodes 125 may become quite large in a large process facility 100, particularly in such a networked environment. To minimize overall data traffic and to avoid bottlenecks at heavily requested controllers, the present invention provides a novel scheme that distributes a large quantity of cyclic data in a deterministic manner from a plurality of nodes that contain the data to a plurality of nodes that require the data. This is accomplished using a publication/subscription distribution scheme that allows data to be transferred to a node that needs the data (i.e., a subscriber controller) from a node that contains the data (i.e., a publisher controller) without requiring the subscriber controller to repeatedly (cyclically) request the data.

An important aspect of the present invention is that the publication/subscription scheme is implemented by first establishing one or more subscription lists that are associated with the publisher controllers. In addition, according to an advantageous embodiment, the above-described publish/subscribe relationships are point-to-point thereby allowing for complex and unique publisher/subscriber relationships.

Figure 2:
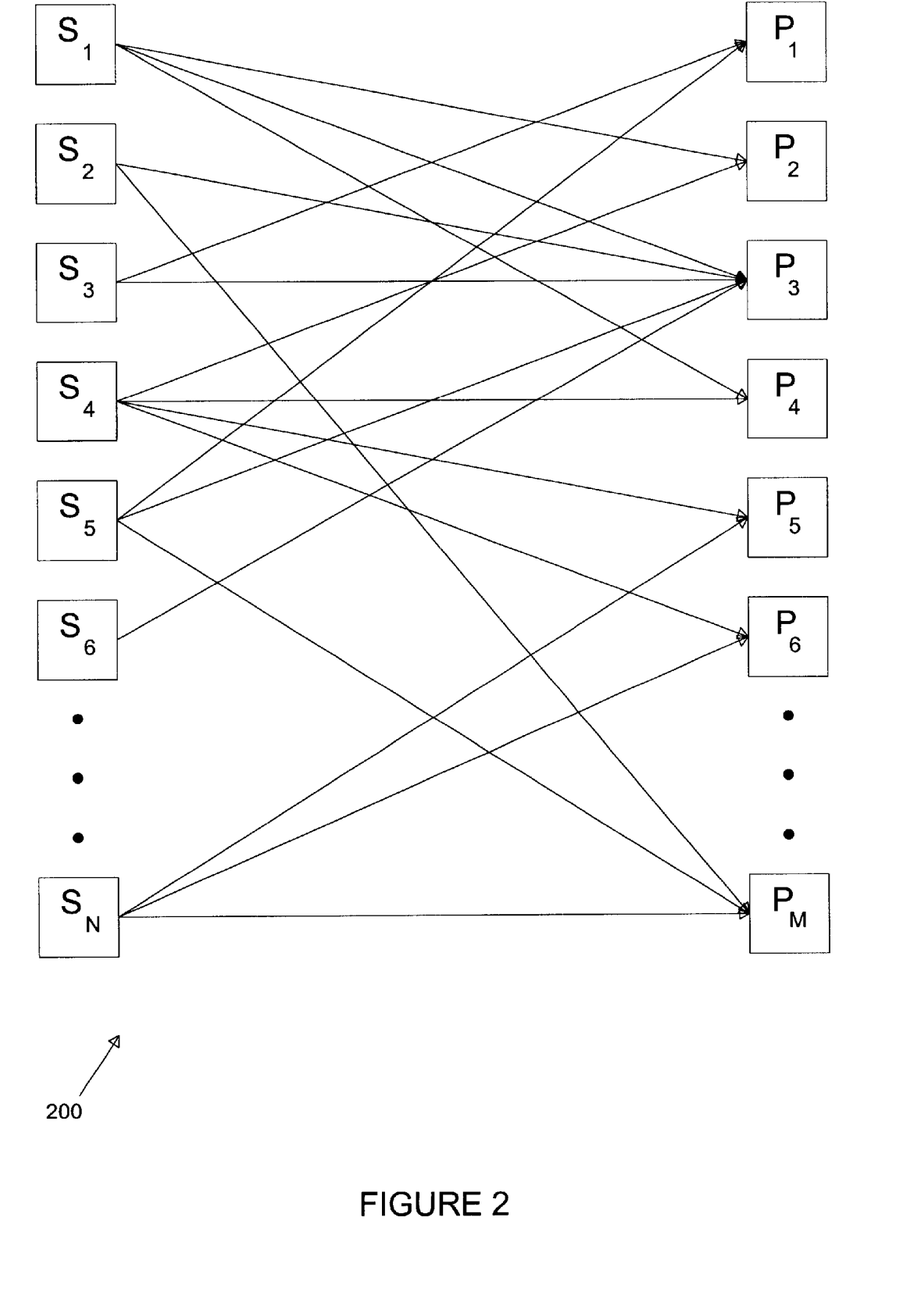
FIG. 2 illustrates exemplary subscription relationships between a plurality of subscriber nodes, $S_1-S_N$, that require data and a plurality of publisher nodes, $P_1-P_M$, that contain the required data.

Turning now to FIG. 2, illustrated is an exemplary subscription relationship (generally designated 200) between a plurality of subscriber controllers, $S_1$–$S_N$, that require data and a plurality of publisher controllers, $P_1$–$P_M$, that contain the required data. The lines connecting the subscriber and publisher controllers (the communication paths among the subscriber and publisher nodes) are representative of subscription messages that are initially sent from the subscriber controllers to the publisher controllers in order to establish one or more subscription lists.

An important aspect of an advantageous embodiment, is the use of "scatter/gather" concepts to accomplish the foregoing. A "client," or ultimate subscriber, using application layer services (e.g., Control Data Access, or "CDA," a well known concept in the art), requests subscription list items from one or more sources, publishers, and the CDA layer transforms such requests into a minimum number of ultimate point-point publication relationships between itself and the publishers, and gathers responses into a cohesive response stream therefor. A "subscription list," as the phrase is used herein, may therefore mean any file, list, array, queue or other repository that indicates or associates data controlled by a publisher controller with one or more subscriber controllers.

According to the present embodiment, the scatter/gather scheme involves the disbursement of heterogeneous location request messages with responses returned upon arrival. Such requests are scattered to various publisher nodes and response are gathered from the same. The CDA service will perform scattering and gathering of request messages. When the CDA service processes a subscriber list, the list is sorted according to publisher node. These requests are sent to respective publisher nodes. As responses arrive, or are gathered, by the CDA service, the response are associated with their initial requests. In an advantageous embodiment, there are multiple Control Execution Environments ("CEEs"). A request thread, in this scenario, is responsible for parceling requests into subsets that are bounded by the destination address of individual requests. Each individual message has an identifier that associates its respective response thereto.

In advantageous embodiments, the subscription lists may include other indicia that may be suitably used to schedule publication, communication or distribution of certain data from the publisher node to the one or more subscription nodes. For instance, each publisher controller might send specifically required data to each individual subscriber controller at a subscription rate specified by the subscriber list (previously defined by the subscription controller)— subscriber controller $S_1$ sends separate subscription messages to publisher controllers $P_2$, $P_3$, and $P_4$, specifying the specific data that $S_1$ needs from each publisher controller. Each subscription message may also specify a subscription rate for each individual datum required, for example, once per day, hourly, once per second, ten times per second, etc.). Thereafter, $P_2$, $P_3$, and $P_4$ send the required data without further prompting from $S_1$. $S_1$ may respond with separate acknowledgment messages to $P_2$, $P_3$, and $P_4$ after the receipt of each package of required data, thereby informing $P_2$, $P_3$, and $P_4$ that the required data has been received.

Once a subscription relationship is established with a publisher controller, it is unnecessary for the subscriber controller to further request data: the data will automatically be sent at the specified subscription rate. This advantageously reduces the overall amount of network data traffic by eliminating repetitive data request messages. It also avoids bottlenecks at publisher nodes that contain data required by a large number of nodes.

It is important to note that each of process controllers 125a–125f and supervisory controller 120 may be a subscriber controller with respect to some data and a publisher controller with respect to other data. Other ones of process controllers 124a–125f may operate exclusively as a subscriber controller or exclusively as a publisher controller. Thus, one of process controllers 125a–125f may be represented as a subscriber controller and as a publisher controller in FIG. 2. Additionally, the lines representing subscription lines between the subscriber controllers and the publisher controllers need not be established concurrently or in any particular order—they are independent of one another. Thus, as process facility 100 is expanded or reduced, subscriber controllers and publisher controllers may be added or deleted from the system without interrupting other ongoing subscription relationships. An important aspect of this embodiment is that the subscription lists represent data relationships and not individual datum relationships. Advantageously, this allows flexible configuration of process facility 100 and allows new controllers to be brought on-line with minimal disruption.

In addition, although the exemplary subscription controllers define or otherwise create their associated subscription lists, such as using scatter/gather schemes, in alternate embodiments, such subscription lists may be defined, at least in part, by the process control system, such as through supervisory controller 120, or an operator. Further, subscription lists may be dynamically modified through incremental additions and deletions whereby a subscriber, or an ultimate client of the application layer, that subscribes to a plurality of data from one or more publishers can dynamically modify or otherwise change one or more subscription relationships without causing the entire subscription to be canceled and restarted. According to this embodiment, the subscriber controller requests that the publication controller add or delete items from the subscription list, such as at a scatter boundary within the ultimate publishers. In addition, such modification may be in response to global or local changes to the process facility (e.g., status, temperature, pressure, flow rate, current, voltage, power, utilization, efficiency, cost and other economic factors, etc.), and may similarly be performed, at least in part, by a controller, the process control system as a whole, or an operator.

Lastly, the present embodiment may include a built-in support for "fail-safe data and publisher node failure detection" whereby a subscriber application layer, on a scatter boundary, detects a failure of the publisher node and returns fail-safe data (and appropriate status information) to a subscriber node for every item scattered to that publisher node.

Figure 3:
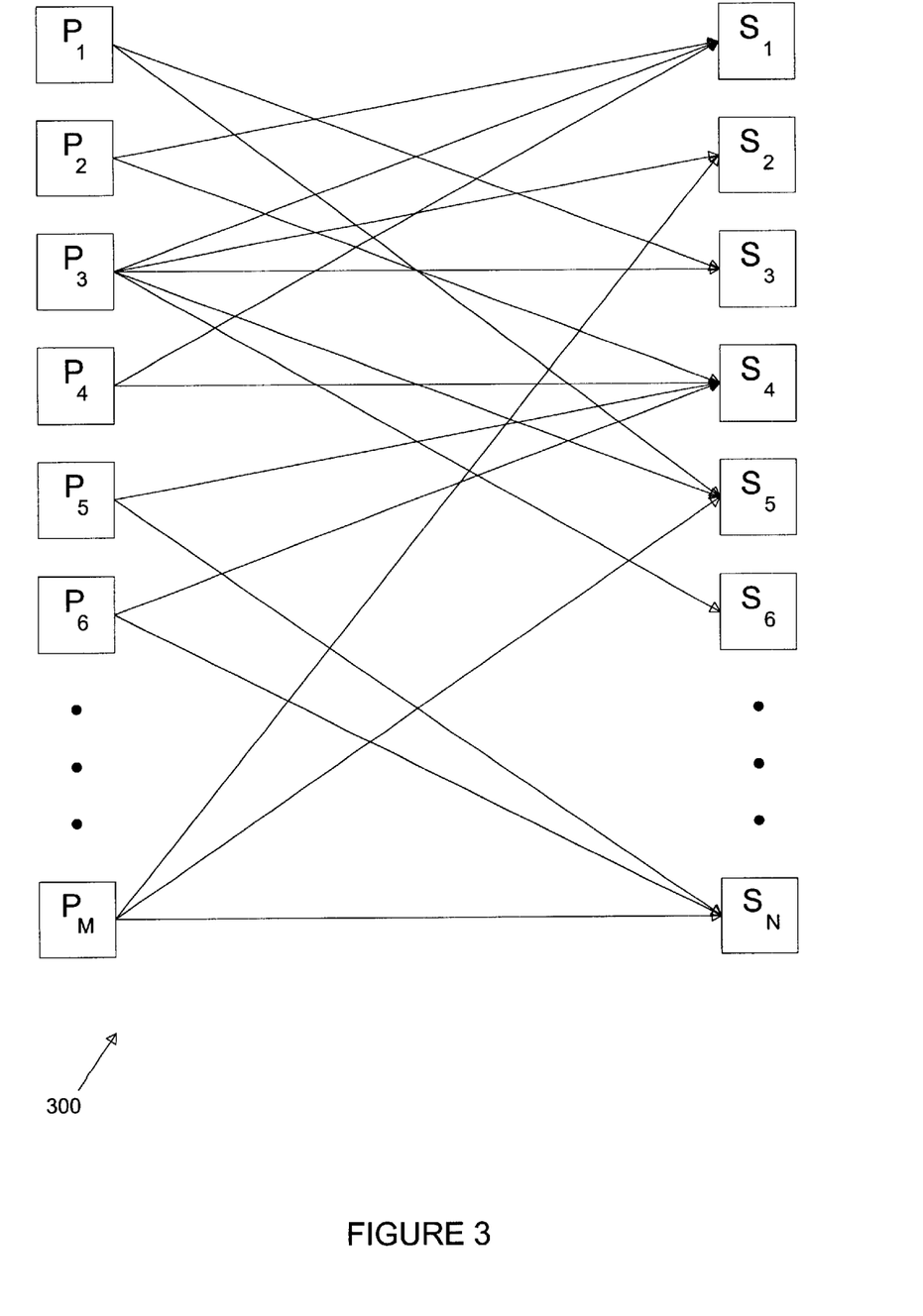
FIG. 3 illustrates exemplary publication relationships between a plurality of subscriber nodes, $S_1-S_N$, that require data and a plurality of publisher nodes, $P_1-P_M$, that contain the required data.

Turning next to FIG. 3, illustrated is a publication relationship (generally designated 300) between a plurality of subscriber controllers, $S_1$–$S_N$, that require data and a plurality of publisher controllers, $P_1$–$P_M$, that contain the required data. The lines connecting the publisher controllers and the subscriber controllers are again representative of data transfers sent from the publisher controllers to the subscriber controllers in accordance with, and in response to, the subscription lists established in the publisher controllers. Request messages are no longer required from the subscriber controllers in order for data to be transferred. The data required by the subscriber controllers is now transferred cyclically by the publisher controllers. However, a subscriber controller may modify, replace, or even delete its current subscription relationship with a publisher controller by sending a subscription modification message, a new subscription request, or a subscription delete message (introduced hereinabove).

The above-described publication/subscription scheme for distributing data in process facility 100 may be further improved by integrating a "Report By Exception" ("RBE") scheme with the publication/subscription scheme for distributing data. In a RBE scheme, data is only transferred from a publisher controller to a subscriber controller if the value of a present instance of the data has changed from a past value that was transferred to the subscriber controller in a previous data cycle. For instance, a subscriber controller that does not receive an updated value for "DATUM X" at the time specified by the subscription rate assumes that "DATUM X" has not been changed from its current value and continues to use that value. The RBE scheme therefore greatly reduces data traffic on the network by not publishing (i.e., distributing) what is essentially redundant data. The present invention can determine whether or not to transfer data according to different algorithms.

In one embodiment of the present invention, a publisher controller may transfer an instance of data only if it is changed at the transfer times determined by the subscription rate. Therefore, multiple changes in the value of a datum during a single cycle will not result in transfer of the data unless the data is different at the update time determined by the subscription rate. In a related embodiment of the present invention, a publisher controller may transfer required data only if the change in the value of the required data exceeds a certain minimum threshold. Advantageously, this prevents the transfer of data in response to minute fluctuations in quantities such as power, flow rate, weight, and the like, which fluctuations may only be caused by the calibration sensitivity of a measuring instrument. In still other embodiments, a publisher controller may transfer a required datum if any change at all occurs during a data cycle.

Figure 4:
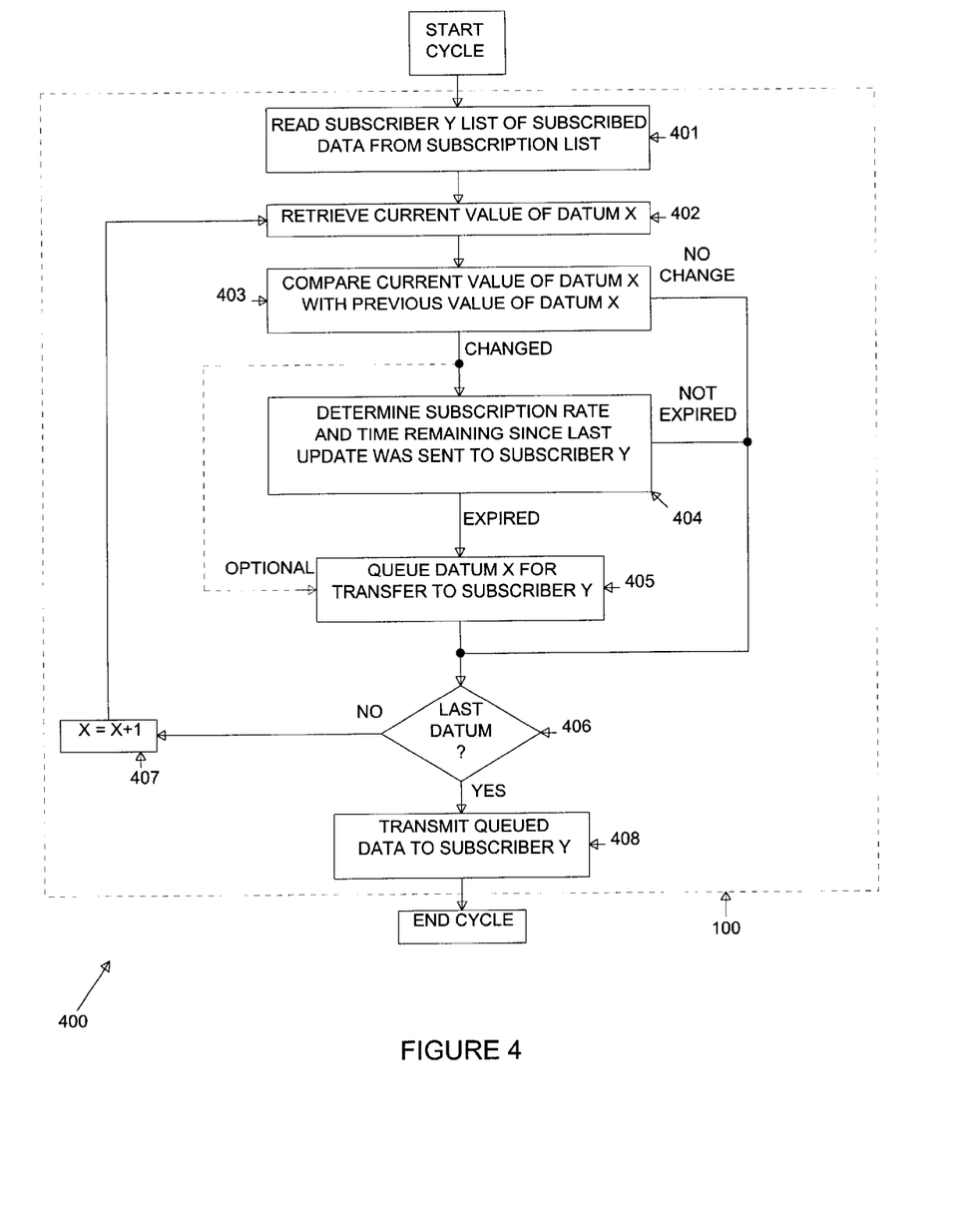
FIG. 4 illustrates a flow diagram of an exemplary data transfer cycle between a selected subscriber node and a selected publisher node.

Turning next to FIG. 4, illustrated is a flow diagram (generally designated 400) of an exemplary data transfer cycle between a subscriber controller/node Y (referred to as subscriber Y in FIG. 4) and a publisher controller/node. According to the exemplary embodiment, the publisher controller examines its internally stored subscriber list and determines the subscribed data required by subscriber controller Y (process step 401). Next, the publisher controller retrieves the current value of a first selected datum, DATUM X, required by subscriber controller Y (process step 402) and compares the current value with the previous value of DATUM X (decisional step 403). If no change has occurred in the value of DATUM X, the publisher controller may determine if DATUM X is the last datum required by subscriber controller Y (decisional step 406) and, if not, retrieve the next required datum (Steps 407 and 402).

According to the illustrated embodiment, there is "heartbeat"-type publication by the publisher node if datum/data has not changed to thereby ensure that the subscriber is assured (such as on a list, item or other basis) that the publisher node has processed the list per the publication rate.

If the data has changed, the publisher controller may determine the subscription rate for DATUM X and the time remaining since the last update was sent to subscriber controller Y (decisional step 404). If the time remaining has not expired (i.e., too soon to send updated DATUM X), the publisher controller may verify whether DATUM X is the last datum required by subscriber controller Y (decisional step 406) and, if not, retrieve the next required datum (process steps 407 and 402). If DATUM X has changed, the publisher controller queue DATUM X for transfer for subscriber controller Y (process step 405).

Optionally, the publisher controller may automatically queue DATUM X for transfer to subscriber controller Y (process step 405) after it is determined in process step 403 that DATUM X has changed. In this way, any change in DATUM X results in a transfer to subscriber controller Y.

After DATUM X has been queued for transfer to subscriber controller Y, the publisher controller verifies whether DATUM X is the last datum required by subscriber controller Y (decisional step 406). If not, the publisher controller continues to retrieve required data (Steps 407 and 402). When the last datum required by subscriber controller Y has finally been examined and queued for transfer, the publisher controller transfers all queued data to subscriber controller Y.

It is important to note that a "next publication time" for a given subscriber node is per subscription list rather than per list item (data or datum). In alternate embodiments, the next publication time may be per list item, a combination of per subscription list and list item, or even adaptable, such as according to the status of one or more processes or responsive to a given status, temperature, pressure, flow rate, current, voltage, power, utilization, efficiency, cost and other economic factors, or other characteristic.

In addition, another important aspect of this embodiment is a smooth degradation to request/response, meaning that it is not always possible for a publisher node to have sufficient memory to hold all subscription requests from some plurality of subscriber nodes, thereby requiring any publication request (such as at the scatter boundary) that cannot be established as publish/subscribe be turned into a request/response such that the subscriber application layer (but not the subscribing node of the application layer) will periodically retry a publication request for that "non-fitting" part. On each try, data will be returned by the publisher node and as soon as resources are available, the publish/subscribe mechanism may be suitably used and cyclic request/response terminated.

Although the present invention and its advantages have been described in detail, those skilled in the art should understand that they can make various changes, substitutions and alterations herein without departing from the spirit and scope of the invention in its broadest form.

What is claimed is:

1. A system for distributing data among nodes of a process facility, said nodes associated by communication paths, said system comprising:
   subscriber nodes that desire data associated with certain processes of said process facility; and
   a publisher node that monitors subscription lists associated with said subscriber nodes, at least one of said subscription lists is modifiable, and, in response thereto, selectively communicates instances of said data to said subscriber nodes using ones of said communication paths, wherein said communication paths have data traffic capacities and said system controls data distribution using said publisher node to efficiently utilize said data traffic capacities wherein said publisher node stores said selectively communicated instances of said data in a memory.

2. The system as set forth in claim 1 wherein said publisher node is responsive to comparisons between present instances of said data and said stored instances of said data.

3. The system as set forth in claim 1 wherein said subscriber nodes communicate characteristics to said publisher node, said publisher node including said characteristics in said subscription lists.

4. A method of operating a system that distributes data among nodes of a process facility, said nodes associated by communication path, said method of operation comprising the steps of:
   monitoring subscription lists associated with subscriber nodes, at least one of said subscription lists is modifiable, said subscription lists indicating an allocation of data associated with processes of said process facility;
   selectively communicating, in response to said monitored subscription lists, instances of said data to said subscriber nodes via ones of said communication paths wherein said communication paths have data traffic capacities;
   controlling data distribution using a publisher node to efficiently utilize said data traffic capacities; and
   storing said selectively communicated instances of said data in a memory.

5. The method as set forth in claim 4 further comprising the step of responding to comparisons between present instances of said data and said stored instances of said data.

6. The method as set forth in claim 4 further comprising the step of communicating characteristics of said subscriber nodes to a publisher node, said publisher node including said characteristics in said subscription lists.

7. The method as set forth in claim 4 further comprising the steps of modifying at least one of said subscription lists.

8. A publisher node, for use in a system for distributing data among nodes of a process facility wherein said nodes are associated by communication paths and include said publisher node, comprising:
   a monitoring controller that monitors subscription lists associated wit subscriber nodes, at least one of said subscription lists is modifiable, said subscription lists indicating an allocation of data associated with processes of said process facility; and
   a communication controller, associated with said monitoring controller, that selectively communicates instances of said data to said subscriber nodes via ones of said communication paths in response to said monitored subscription lists, wherein said communication paths of said system have data traffic capacities and said publisher node is capable of controlling data distribution by efficiently utilizing said data traffic capacities, wherein said publisher node is further capable of storing said selectively communicated instances of said data in a memory associated therewith.

9. The publisher node as set forth in claim 8 further responsive to comparisons between present instances of said data and said stored instances of said data.

10. The publisher node as set forth in claim 8 wherein said subscriber nodes of said system communicate characteristics to said publisher node, and said publisher node includes said characteristics in said subscription lists.

11. A real time process control system for use to control a process facility, comprising:
   a plurality of sensors and controllable devices that are associated with processes of said process facility;
   communication paths associating said plurality of sensors and controllable devices with a computer system; and
   said computer system operates on data relating to said process facility, and distributes said data among distributed nodes of said computer system, said nodes associated with one another by ones of said communication paths, said computer system comprising:

subscriber nodes that desire data associated with certain of said processes; and a publisher node that monitors subscription lists associated with said subscriber nodes, at least one of said subscription lists is modifiable, and, in response thereto, selectively communicates instances of said data to said subscriber nodes using ones of said communication paths, wherein said communication paths have data traffic capacities and said computer system controls data distribution using said publisher node to efficiently utilize said data traffic capacities, wherein said publisher node stores said selectively communicated instances of said data in a memory.

12. The real time process control system as set forth in claim 11 wherein said publisher node is responsive to comparisons between present instances of said data and said stored instances of said data.

13. The real time process control system as set forth in claim 11 wherein said subscriber nodes communicate characteristics to said publisher node, said publisher node including said characteristics in said subscription lists.

14. A system for distributing data among nodes of a process facility, said nodes associated by communication paths, said system comprising:

subscriber nodes that desire data associated with certain processes of said process facility; and a publisher node that monitors subscription lists associated with said subscriber, nodes and compares present instances of said desired data and previous instances of said desired data, and, in response thereto, selectively stores in a memory and communicates said present instances of said desired data to said subscriber nodes using ones of said communication paths, wherein said communication paths have data traffic capacities and said system controls data distribution using said publisher node to efficiently utilize said data traffic capacities.

15. The system as set forth in claim 14 wherein said subscriber nodes communicate characteristics to said publisher node, said publisher node including said characteristics in said subscription lists.

16. A method of operating a system that distributes data among nodes of a process facility, said nodes associated by communication paths, said method of operation comprising the steps of:

monitoring subscription lists associated with subscriber nodes, said subscription lists indicating an allocation of desired data associated with processes of said process facility; and comparing present instances of said desired data and previous instances of said desired data; and selectively storing in a memory and communicating, in response to said monitored subscription lists, said present instances of said desired data to said subscriber nodes via ones of said communication paths, wherein said communication paths have data traffic capacities and further comprises the step of controlling data distribution using a publisher node to efficiently utilize said data traffic capacities.

17. The method as set forth in claim 16 further comprising the step of communicating characteristics of said subscriber nodes to a publisher node, said publisher node including said characteristics in said subscription lists.

18. The method as set forth in claim 16 further comprising the steps of modifying at least one of said subscription lists.

19. A publisher node, for use in a system for distributing data among nodes of a process facility wherein said nodes are associated by communication paths and include said publisher node, comprising:

a monitoring controller that monitors subscription lists associated with subscriber nodes, said subscription lists indicating an allocation of data associated with processes of said process facility and compares present instances of said data and previous instances of said data; and a communication controller, responsive to said monitoring controller, that selectively stores in a memory and communicates said present instances of said data to said subscriber nodes via ones of said communication paths, wherein said communication paths of said system have data traffic capacities and said publisher node is capable of controlling data distribution by efficiently utilizing said data traffic capacities.

20. The publisher node as set forth in claim 19 wherein said subscriber nodes of said system communicate characteristics to said publisher node, and said publisher node includes said characteristics in said subscription lists.

21. The publisher node as set forth in claim 19 wherein at least one of said subscription lists is modifiable.

22. A real time process control system for use to control a process facility, comprising:

a plurality of sensors and controllable devices that are associated with processes of said process facility;

communication paths associating said plurality of sensors and controllable devices with a computer system; and said computer system operates on data relating to said process facility, and distributes said data among distributed nodes of said computer system, said nodes associated with one another by ones of said communication paths, said computer system comprising:

subscriber nodes that desire data associated with certain of said processes; and a publisher node that monitors subscription lists associated with said subscriber nodes and compares present instances of said desired data and previous instances of said desired data, and, in response thereto, selectively stores in a memory and communicates said present instances of said desired data to said subscriber nodes using ones of said communication paths, wherein said communication paths have data traffic capacities and said computer system controls data distribution using said publisher node to efficiently utilize said data traffic capacities.

23. The real time process control system as set forth in claim 22 wherein said subscriber nodes communicate characteristics to said publisher node, said publisher node including said characteristics in said subscription lists.

24. The real time process control system as set forth in claim 22 wherein at least one of said subscription lists is modifiable.

* * * * *